UNITED STATES PATENT OFFICE.

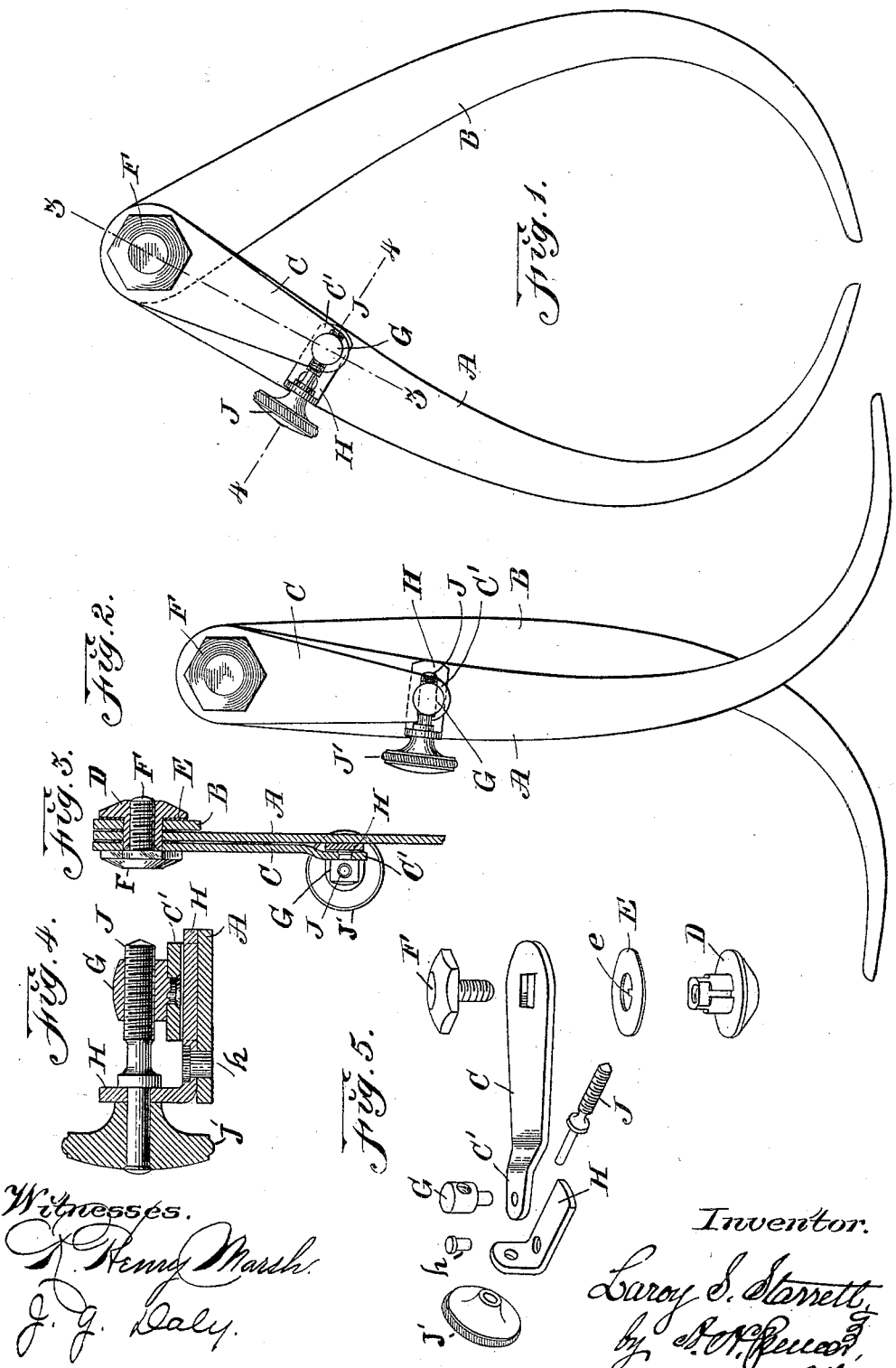

LAROY S. STARRETT, OF ATHOL, MASSACHUSETTS, ASSIGNOR TO THE
L. S. STARRETT COMPANY, OF SAME PLACE.

CALIPERS AND DIVIDERS.

SPECIFICATION forming part of Letters Patent No. 672,424, dated April 16, 1901.

Application filed April 5, 1900. Serial No. 11,597. (No model.)

*To all whom it may concern:*

Be it known that I, LAROY S. STARRETT, of Athol, in the county of Worcester and State of Massachusetts, have invented certain new and useful Improvements in Calipers and Dividers, of which the following is a specification.

This invention relates to the class of calipers and dividers in which, in addition to the general movement of the two legs on their pivot, provision is made for their accurate adjustment over comparatively-limited distances by means of a short supplementary arm and an adjusting-screw. An instance of this general construction is found in the Letters Patent No. 539,759, granted to me May 21, 1895.

The object of my present improvement is to provide for these tools an adjusting device adapted for dividers and for both inside and outside calipers, such device in no way limiting the general movement of the legs and having also a wider range of adjustability than those hitherto known. The adjusting-screw is mounted for rotation without longitudinal movement in a suitable bracket connected to one of the legs, and the threaded body of said screw engages the thread of a swiveled nut mounted on the free end of the supplementary arm, whereby the rotation of such screw moves the leg to which such bracket is secured toward or from the other leg, which is made fast frictionally on the pivot, while the first-named leg has more freedom of movement thereon. The bracket is mounted on the outer face of the leg which carries it and has a flat base extending across such face, and the free end of the arm is offset outwardly enough to pass over or lie outside of such bracket-base. The legs and arm are connected by an enlarged axially-threaded pivot having a broad flanged head and a screw engaging therein and formed with a corresponding head of hexagon form, suitable washers being interposed. I sometimes form one of the washers with a teat or projection extending inwardly into a groove or spline in the wall of the pivot. This washer, encircling the rivet and located between the two legs, aids to hold the outermost leg against the head of the rivet, the tip of which is squared to receive the short arm on which the adjusting-screw acts.

In the drawings, Figure 1 is a plan view of my instrument. Fig. 2 is a like view of the same tool used as an inside caliper. Fig. 3 is a longitudinal section on line 3 3 of Fig. 1. Fig. 4 is a transverse section on line 4 4 of Fig. 1. Fig. 5 represents some of the parts detached.

A and B are the two legs, and C the supplementary arm, all connected at top by a suitable pivot. The preferred form shown has a stout substantially cylindrical rivet D, internally threaded, formed with a broad flange at one end and squared at the other, where the short arm C is mounted. Washers E are interposed between the parts and all are held with proper friction by the broad-headed screw F, the stem of which engages the thread in rivet D. The washer, which adjoins leg B, is shown in Fig. 5 as formed with a projection $e$ to enter a groove in pivot D; but this is not essential. The arm C has a square hole at one end to fit on the squared tip of rivet D, and its other end, as shown in Figs. 3 and 5, is offset outwardly from leg A to a distance about equal to its thickness and then continues in its former direction parallel to said leg. On this offset part C', I mount a swiveled nut G, provided with a reduced stem passing through and turning in a perforation in the part C' and headed to prevent withdrawal. A bracket H is secured transversely to the outer face of leg A, its flat body extending across said leg beneath the offset part C' of the arm C, said bracket at its outer end being turned up and perforated to receive the cylindrical stem of the adjusting-screw J, the threaded body of which engages the threads of the swiveled nut G. A radial collar on the screw-stem bears against the face of the upturned end of the bracket. The milled head J' of the screw J is affixed to its smooth stem on the opposite side of the bracket, thus preventing endwise movement of the screw.

My improved construction is very advantageous. The bracket H, being bent at a right angle, lies at one end between leg A and the nut G, swiveled on the offset part of arm C, while the upturned end of said bracket forms an admirable bearing for the adjusting-screw, which engages said nut. The swiveled nut G turns in its bearing as the rotation of the screw J swings the supplementary arm C through a short arc, (or rather moves the leg A on its pivot with relation to said arm.) This swivel action prevents any tendency to bind or cramp the adjusting-screw at the extreme ends of the swinging movement, since the parts aline themselves in use of the tool. If the adjusting-screw is greatly prolonged, the bracket H will turn slightly on the rivet $h$, which unites it to the leg A.

I claim as my invention—

In calipers and dividers, the legs A B adjacent to each other and united by a suitable pivot, in combination with a supplementary arm C mounted external to said legs, offset at its free end and carrying a swiveled nut G, a transverse bracket H mounted on one of the legs adjacent to said nut, and an adjusting-screw journaled in the upward end of said bracket and engaging the thread of said nut, substantially as set forth.

In testimony whereof I have affixed my signature in presence of two witnesses.

LAROY S. STARRETT.

Witnesses:
 FRANK E. WING,
 WILLARD G. NIMS.